(12) United States Patent
Dalessandro et al.

(10) Patent No.: US 10,095,415 B2
(45) Date of Patent: *Oct. 9, 2018

(54) PERFORMANCE DURING PLAYBACK OF LOGGED DATA STORAGE OPERATIONS

(71) Applicant: NetApp, Inc., Sunnyvale, CA (US)

(72) Inventors: Dennis Dalessandro, Hadfield, PA (US); Ellard Roush, Burlingame, CA (US); Joseph Brown, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 15/272,154

(22) Filed: Sep. 21, 2016

(65) Prior Publication Data

US 2017/0010813 A1 Jan. 12, 2017

Related U.S. Application Data

(63) Continuation of application No. 14/281,774, filed on May 19, 2014, now Pat. No. 9,459,970.

(51) Int. Cl.
*G06F 11/34* (2006.01)
*G06F 3/06* (2006.01)
*G06F 11/14* (2006.01)
*G06F 12/1018* (2016.01)

(52) U.S. Cl.
CPC .............. *G06F 3/061* (2013.01); *G06F 3/065* (2013.01); *G06F 3/067* (2013.01); *G06F 3/0619* (2013.01); *G06F 3/0665* (2013.01); *G06F 11/1441* (2013.01); *G06F 11/1471* (2013.01); *G06F 12/1018* (2013.01); *G06F 2201/81* (2013.01); *G06F 2201/82* (2013.01); *G06F 2201/88* (2013.01)

(58) Field of Classification Search
CPC .......................... G06F 11/1471; G06F 11/1474
USPC .................................... 714/18, 19, 47.2
See application file for complete search history.

(56) References Cited

U.S. PATENT DOCUMENTS

| 8,639,989 | B1 | 1/2014 | Sorenson, III et al. |
|---|---|---|---|
| 9,223,843 | B1 | 12/2015 | Madhavarapu et al. |
| 2004/0221116 | A1 | 11/2004 | Hu et al. |
| 2007/0198602 | A1 | 8/2007 | Ngo et al. |
| 2008/0120463 | A1* | 5/2008 | Ashmore .............. G06F 3/0613 711/114 |
| 2009/0089252 | A1 | 4/2009 | Galitsky et al. |
| 2010/0232288 | A1 | 9/2010 | Coatney et al. |
| 2011/0099342 | A1 | 4/2011 | Ozdemir |
| 2012/0042202 | A1 | 2/2012 | Wenzel |
| 2012/0166390 | A1 | 6/2012 | Merriman et al. |
| 2012/0226936 | A1 | 9/2012 | Prabhakaran et al. |
| 2013/0290249 | A1 | 10/2013 | Merriman et al. |
| 2013/0325828 | A1 | 12/2013 | Larson et al. |
| 2014/0040572 | A1 | 2/2014 | Kotagiri et al. |

(Continued)

*Primary Examiner* — Chae M Ko
(74) *Attorney, Agent, or Firm* — LeClairRyan PLLC

(57) ABSTRACT

Technology is disclosed for improving performance during playback of logged data storage operations. The technology can monitor a log to which data storage operations are written before data is committed to a volume; determine counts of various types of data storage operations; and when the counts exceed a specified threshold, cause the data storage operations to be committed to the volume. Some data storage operations can be coalesced during playback to further improve performance.

14 Claims, 11 Drawing Sheets

(56) References Cited

U.S. PATENT DOCUMENTS

2014/0164831 A1 6/2014 Merriman et al.
2014/0181035 A1 6/2014 Moue et al.
2014/0279917 A1 9/2014 Minh et al.
2014/0279930 A1 9/2014 Gupta et al.

* cited by examiner

PERFORMANCE DURING PLAYBACK OF LOGGED DATA STORAGE OPERATIONS

This application is a continuation of prior U.S. patent application Ser. No. 14/281,774, filed May 19, 2014, which is hereby incorporated by reference in its entirety.

BACKGROUND

Data storage servers ("storage servers") can store data redundantly, e.g., across multiple data storage devices. Storage servers may employ various forms of data storage devices, e.g., hard disk drives, solid state drives, tape devices, etc. The data storage devices are typically implemented as one or more storage "volumes" that comprise a cluster of data storage devices, in which the volumes define an overall logical arrangement of storage space. For example, a storage server can serve a large number (e.g., 150 or more) of discrete volumes. Each volume is generally associated with its own file system (e.g., a write anywhere file system).

To improve performance, storage servers can temporarily store various data storage commands ("storage operations" or simply "operations") they receive from client computing devices in a region of system memory of the storage servers. By storing the data they receive in system memory, the storage servers can immediately return an acknowledgement message to the client computing devices rather than waiting for slower data storage devices to first actually store the data first. However, system memory can be erased before the data is stored to data storage devices, e.g., in an event of a power (or other) failure.

To reduce the likelihood of data loss in such circumstances, the storage servers may also store the data in nonvolatile random access memory (NVRAM), e.g., in a log file stored in the NVRAM. By initially storing the operations in the NVRAM log file, the storage server can immediately return an acknowledgment to the client computing devices rather than wait for the operation to complete on one or more data storage devices. Moreover, in the event of failure of the storage server or data storage devices, the storage operations can be "replayed," thereby preventing loss of data. The NVRAM can have various associated circuitry to prevent data loss, e.g., battery backup, FLASH-type memory, etc. By logging storage operations (e.g., create file, write data, delete data, etc.) as "journal" entries in the log file, the storage server can conform with data storage protocols that require the storage server not to acknowledge the storage operation before writing data to persistent storage.

The NVRAM log file can accumulate storage operations until a consistency point (CP) is triggered. CPs can be triggered at various time intervals (e.g., fixed time intervals), or when other events arise, e.g., the NVRAM is almost fully filled. At each CP, data is transferred from the storage server system memory to underlying data storage volumes, and the NVRAM is cleared of the transferred data upon successful transfer.

If the storage server's operations are interrupted unexpectedly, e.g., because of power failure or other subsystem problem, its operating system or file system (e.g., write anywhere file system) can recover information by using information stored in the NVRAM log file between the time of the last CP and the unexpected interruption, e.g., by using a "replay" operation.

Technological advances have caused a significant reduction in the price of NVRAM and processors with a concomitant increase in logic density. Thus, it is now possible to employ much more NVRAM and processors (e.g., processor "cores") at a lower cost than was previously possible. For example, a storage server can employ multiple gigabytes of NVRAM and 16 or more processor cores. It can be desirable to have a large amount of NVRAM to increase the throughput of the storage server. On the other hand, having more storage operations that are saved in the log file can cause an increase in the time required to complete a playback (or replay operation). To make it possible for the storage server to operate at high speed while maintaining an acceptably small recovery time, it is desirable to reduce the replay time per operation to compensate for the greater number of operations being recorded in the log file.

DETAILED DESCRIPTION

In various embodiments, the technology reduces the number of operations and/or time that is taken while committing logged operations to a data storage device or volume. The technology can monitor a log and proactively trigger consistency points e.g., based on various heuristics or measures. As a first example, the technology can ensure that a consistency point will not cause a data storage server to be unavailable for a longer time period than an outage commitment or service level objective. By tracking a number of operations (e.g., create file, write file, truncate file, etc.) and the time required to complete the operations, the technology can trigger consistency points so that the time taken does not exceed the outage commitment or service level objective.

In various embodiments, the technology can reduce the number of operations dispatched to a filesystem during replay by modifying (e.g., "coalescing") operations. As an example, when two or more data storage operations write to adjacent portions of a data storage device or volume, the technology can coalesce the two or more operations so that only one operation is transmitted to the data storage device or volume. This can be beneficial in some file systems, e.g., write anywhere file systems, that can perform better when a large sequence of bytes is written to consecutive portions of data storage devices or volumes. Moreover, by transmitting a smaller number of messages, the entire system can be optimized by reducing data transfers. As a second example, if a file is truncated or deleted, the technology can remove from the log any data storage operations stored earlier that write data to the truncated portions of the file or the deleted file. This can be done because the data would be unavailable after the truncation or deletion.

Several embodiments of the described technology are described in more detail in reference to the figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide network, or a point-to-point dial-up connection. Thus, computer-readable media can comprise computer-readable storage media (e.g., "non-transitory" media) and computer-readable transmission media.

Figure 1:
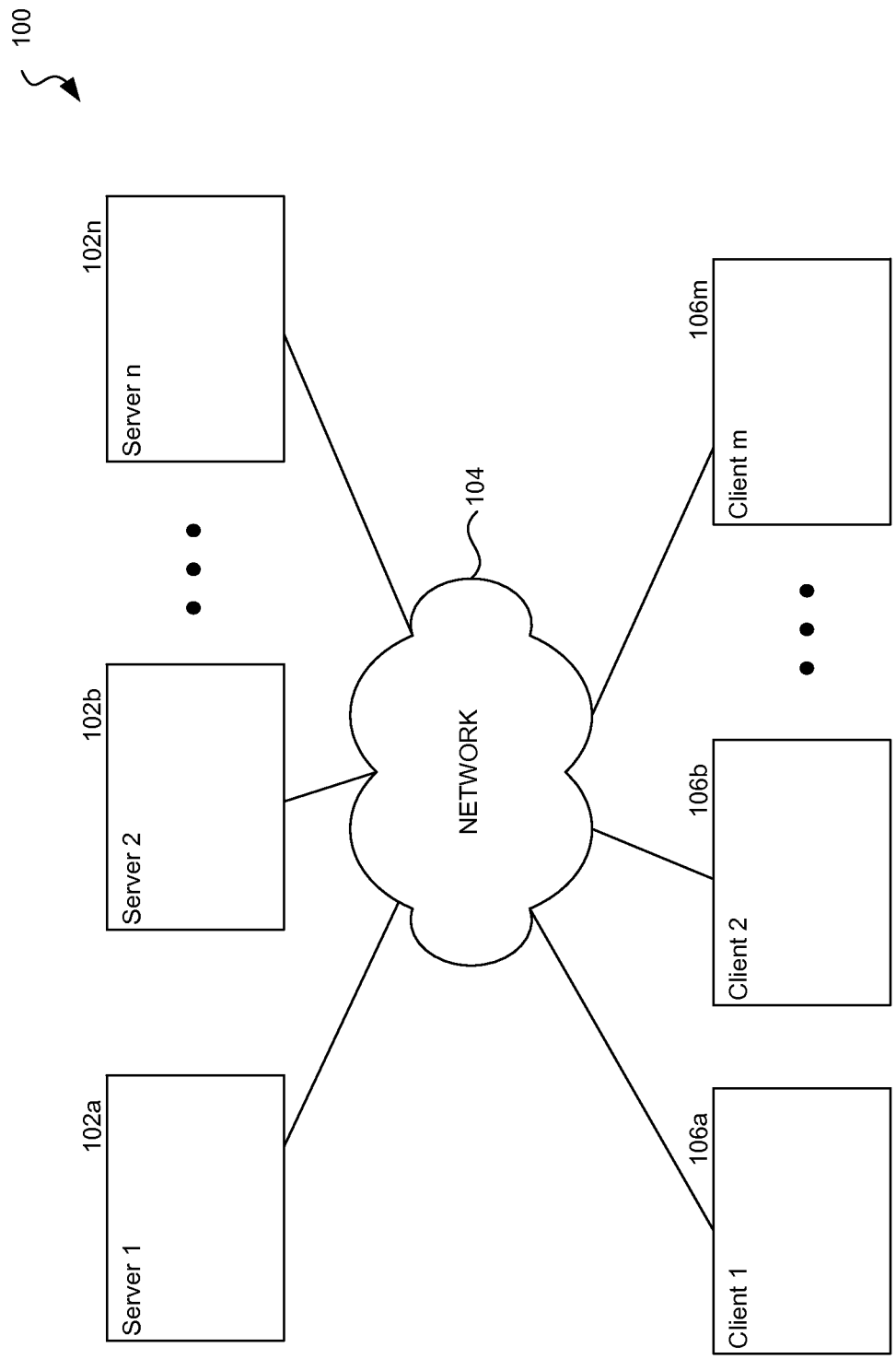
FIG. 1 is a block diagram illustrating various components in an environment in which the disclosed technology may operate in various embodiments.

Turning now to the figures, FIG. 1 is a block diagram illustrating various components 100 in an environment in which the disclosed technology may operate in various embodiments. The components 100 can include one or more server computing devices, e.g., data storage server 102a, data storage server (also, "storage server") 102b, and data storage server 102n. The server computing devices 102 are described in more detail below in relation to FIG. 2. The server computing devices 102 can communicate with one or more client computing devices 106 over a network 104. The network 104 can be an intranet, the Internet, or a special-purpose network. Multiple client computing devices 106 (e.g., client computing devices 106a, 106b, and 106m) can communicate with the server computing devices 102, e.g., to store data.

Figure 2:
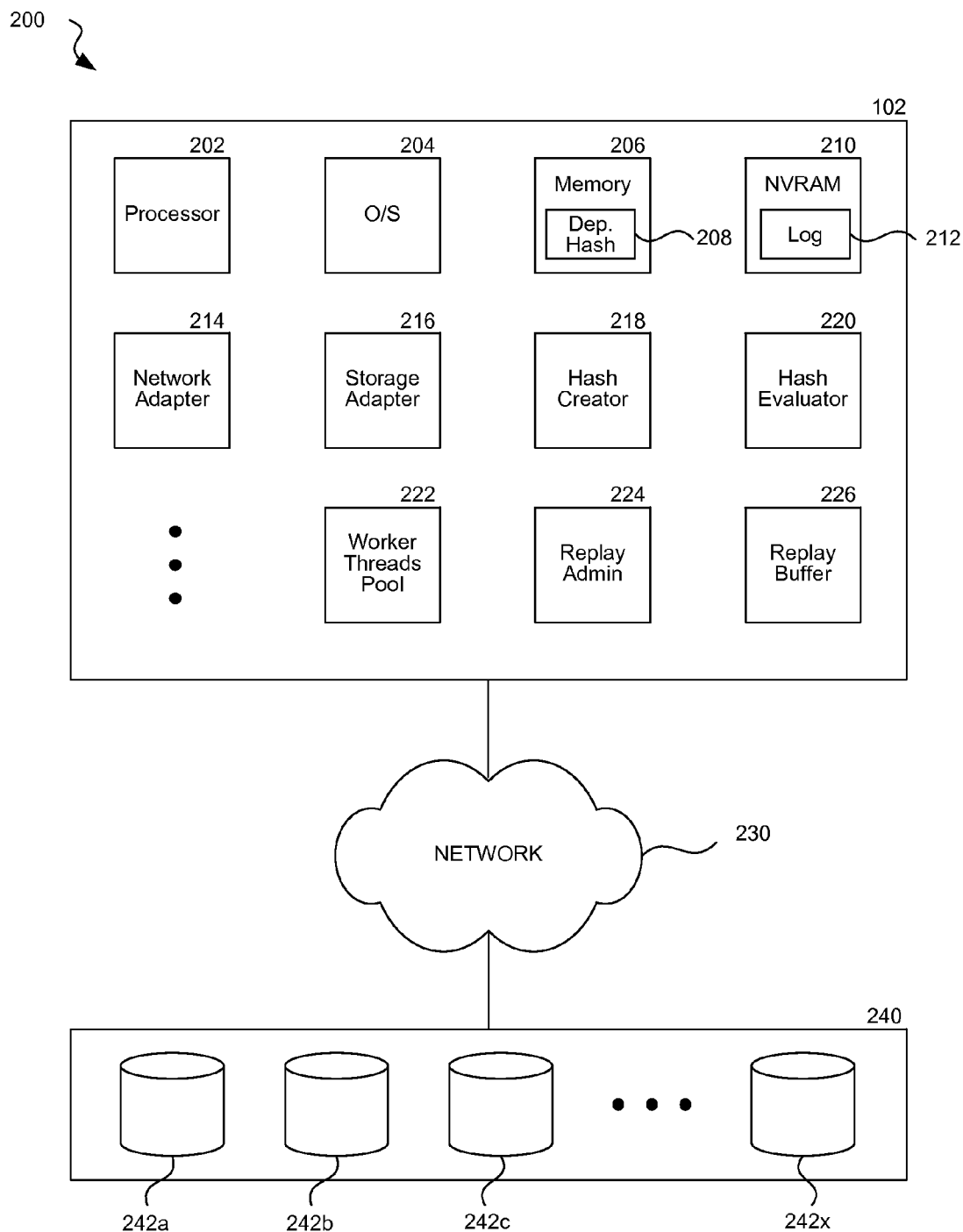
FIG. 2 is a block diagram illustrating various components associated with the disclosed technology in various embodiments.

FIG. 2 is a block diagram illustrating various components 200 of a data storage server 102. The data storage server 102 can be referred to as a network storage appliance or "filer" and can be a special-purpose computer that provides file service relating to the organization of information on data storage devices 242, e.g., hard disk drives or solid state drives. The illustrated storage server 102 comprises one or more processors 202 (e.g., single or multi-core processors), memory 206, a network adapter 214, and a storage adapter 216 interconnected by a system bus (not illustrated). The storage server 102 also includes an operating system 204 that implements a file system to logically organize the information as a hierarchical structure of directories and files on data storage devices 242. A processor 202 can cause the storage adapter 216 to read and write data from/to data storage devices 242.

In the illustrative embodiment, the memory 206 has storage locations that are addressable by the processor and adapters, e.g., for storing software program code and/or data. A portion of the memory may be further organized as a "dependency hash" 208 for storing data structures employed by the disclosed technology. The processor and adapters may, in turn, comprise processing elements and/or logic circuitry configured to execute software code and manipulate data structures. The operating system 204, portions of which are typically resident in memory 206 and/or storage devices, and executed by the processors 202, functionally organizes stored data by, e.g., invoking storage operations in support of a file service implemented by the storage server 102.

The network adapter 214 comprises mechanical, electrical, and signaling circuitry needed to connect the storage server 102 to a client computing device 106 over network 104. The client computing device 106 may be a general-purpose computer configured to execute applications, e.g., a database application. Moreover, the client computing device 106 may interact with the storage server 102 in accordance with a client/server model of information delivery. That is, the client may request the services of the filer, and the filer may return the results of the services requested by the client, e.g., by exchanging data communications packets encapsulating a data communications protocol, e.g., in a common Internet file system (CIFS) protocol or network file system (NFS) protocol format.

The storage adapter 216 can cooperate with the operating system 204 executing on the storage server 102 to access information requested by a client computing device 106. The information may be stored on the data storage devices 242, e.g., in logical "volumes." The storage adapter 216 includes input/output (I/O) interface circuitry that couples to the data storage devices 242 over an I/O interconnect arrangement, e.g., a conventional high-performance, Fibre Channel serial link topology, SAS, SCSI, SATA, etc. The storage adapter 216 can communicate with the data storage devices 242 over a network (or switch) 230. The data storage devices 242 can be housed in an enclosure 240, e.g., in the same rack as the storage server 102 or a different rack.

The storage server 102 includes an NVRAM 210 that provides fault-tolerant backup of data, enabling the integrity of data storage transactions to survive a service interruption based upon a power failure or other fault. The size of the NVRAM is variable and can be sized sufficiently large to log a specified number of transactions (e.g., several seconds' or minutes' worth of data at expected storage throughput). The NVRAM can be written to before each client request is transferred to data storage devices, but before an acknowledgment is returned to the requesting client. For example, the POSIX operating system standard requires that an acknowledgement is returned only after data is stored at a destination data storage device. The NVRAM can store a log 212, which can be a file that is used to "journal" data storage operations, e.g., in sequential order. As storage server 102 receives storage operations (e.g., to create files, write data, etc.), the storage server can first store them in the log 212. When replayed in the same order, e.g., to commit the data to data storage devices 242, the result would be as if the received storage operations were directly committed to the data storage devices 242. In some embodiments, other persistent media may be employed, e.g., solid state drives.

The storage server 102 additionally includes a hash creator component 218, a hash evaluator component 220, a worker threads pool 222, a replay admin component 224, and a replay buffer 226. The hash creator component 218 can create the dependency hash 208, e.g., based on operations stored in the log 212, and store the created hash in memory 206. The hash evaluator component 220 can evaluate the dependency hash 208, e.g., in connection with parallel playback of operations stored in the log 212. As an example, when the replay admin component 224 is invoked after the storage server 102 reboots from an unintended shutdown (or other unexpected event), the replay admin component 224 may employ the hash creator 218 to determine what operations can execute concurrently, and subsequently cause the hash evaluator component 220 to replay the stored operations. The replay admin component 224 may select one or more worker threads from the worker threads pool 222 to configure for use as a hash evaluator. Hash evaluator components 220 implement mechanics of the actual replay of journal data based on rules established by the dependency hash.

Figure 3A:
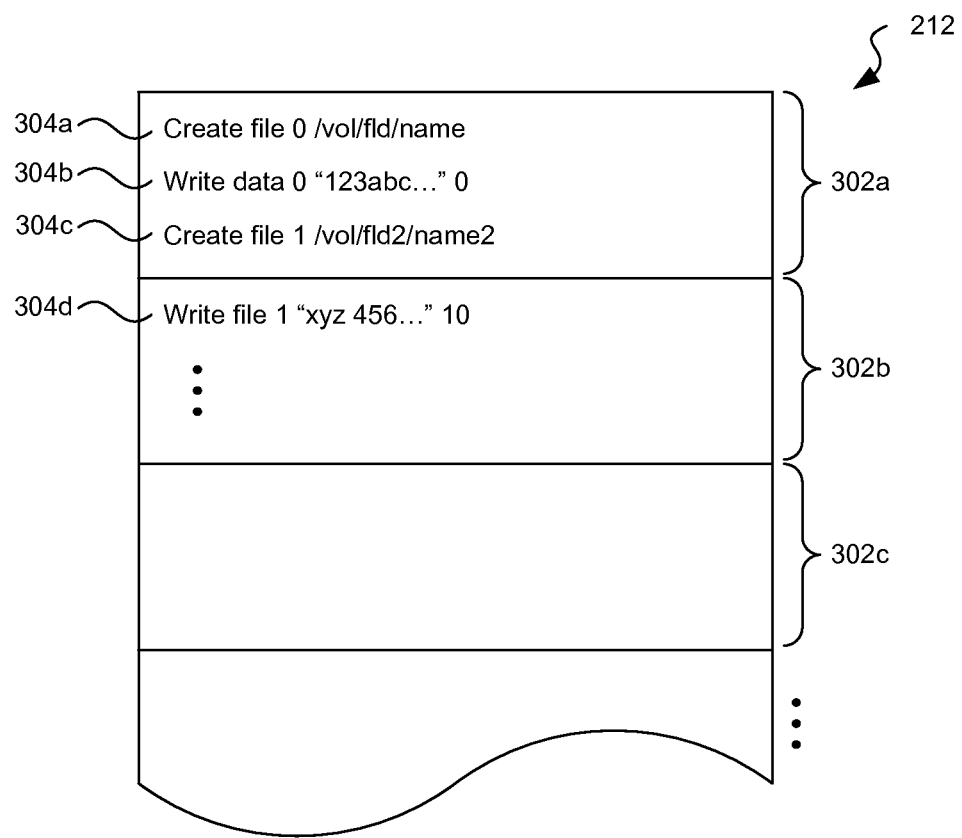
FIG. 3A is a table diagram illustrating a portion of a log file stored in an NVRAM, consistent with various embodiments.

FIG. 3A is a table diagram illustrating a portion of a log file 212 stored in an NVRAM, consistent with various embodiments. The log file 212 may be divided into multiple portions, e.g., portions 302a, 302b, and 302c. Each portion may include one or more data storage operations. As an example, portion 302a includes operations 304a, 304b, and 304c. Although only three operations are illustrated as being stored by portion 302a, a portion of a log file may store dozens or even hundreds of operations. The stored operations can be data storage operations, e.g., to create files or write data. The data storage operations can be targeted to one or more volumes handled by a storage server that stores the log. Storage operations targeting a particular file in a volume can span across multiple portions of the log 212. As an example, operations 304c and 304d target a common "file 1," but span across log portions 302a and 302b.

While FIG. 3A and each of the table diagrams discussed below show a table whose contents and organization are designed to make them more comprehensible by a human reader, those skilled in the art will appreciate that actual data structures used by the facility to store this information may differ from the table shown in that they, for example, may be organized in a different manner, may contain more or less information than shown, may be compressed and/or encrypted, etc.

Figure 3B:
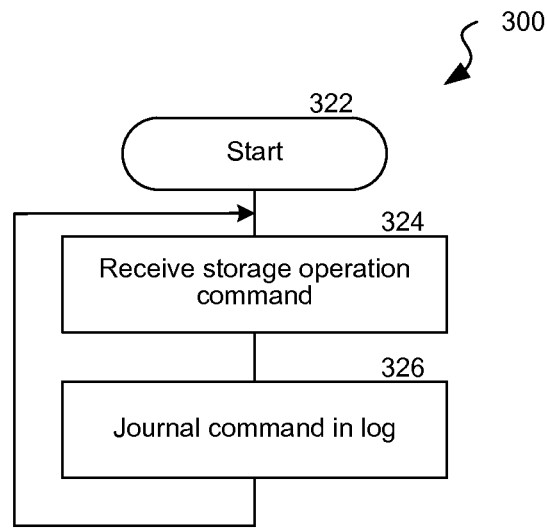
FIG. 3B is a flow diagram illustrating a routine for journaling received storage operations, consistent with various embodiments.

FIG. 3B is a flow diagram illustrating a routine 300 for journaling received storage operations, consistent with various embodiments. The routine 300 begins at block 322. At block 324, the routine 300 receives a storage operation command, e.g., from a client computing device. The storage operation command can be, e.g., to create a file, write data from a file, read data from a file, etc. At block 326, the routine 300 can journal commands in a log. As an example, a storage server can have one or more logs and journal commands to create files or write data to one of its logs. The routine 300 then continues at block 324, where it awaits or receives additional storage operation commands.

Those skilled in the art will appreciate that the logic illustrated in FIG. 3B and described above, and in each of the flow diagrams discussed below, may be altered in a variety of ways. For example, the order of the logic may be rearranged, substeps may be performed in parallel, illustrated logic may be omitted, other logic may be included, etc.

Figure 3C:
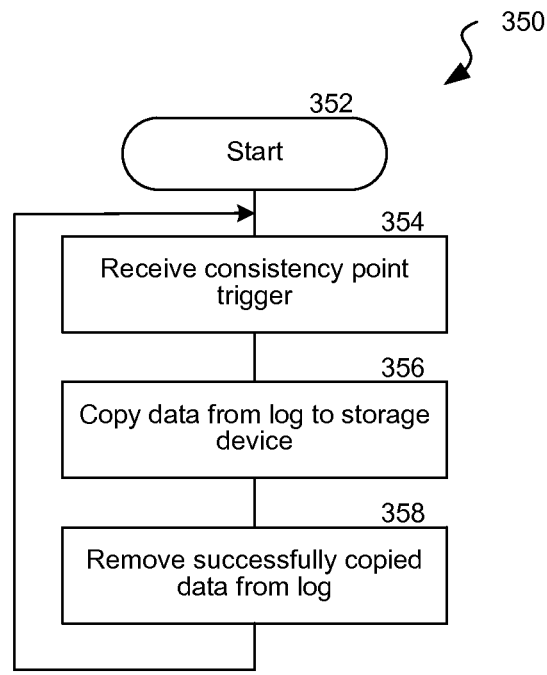
FIG. 3C is a flow diagram illustrating a routine for handling a consistency point trigger, consistent with various embodiments.

FIG. 3C is a flow diagram illustrating a routine 350 for handling a consistency point trigger, consistent with various embodiments. The routine 350 begins at block 352. At block 354, the routine 350 receives a consistency point trigger. Alternatively, the routine 350 may receive an indication that the storage server is recovering from an unintended shutdown or other error. At block 356, the routine 350 writes data reconstructed from one of its logs, e.g., in main system memory, to one or more storage devices or a storage volume. At block 358, the routine 350 removes from the log successfully written data. Because the data is now successfully committed to a data storage device, the data can be removed from the log. The routine 350 then continues at block 354, where it awaits or receives another consistency point trigger. In addition to recovery from inadvertent shutdowns or other error conditions, consistency point triggers may be generated at various times, e.g., periodically, when the NVRAM is almost full, etc.

Figure 4:
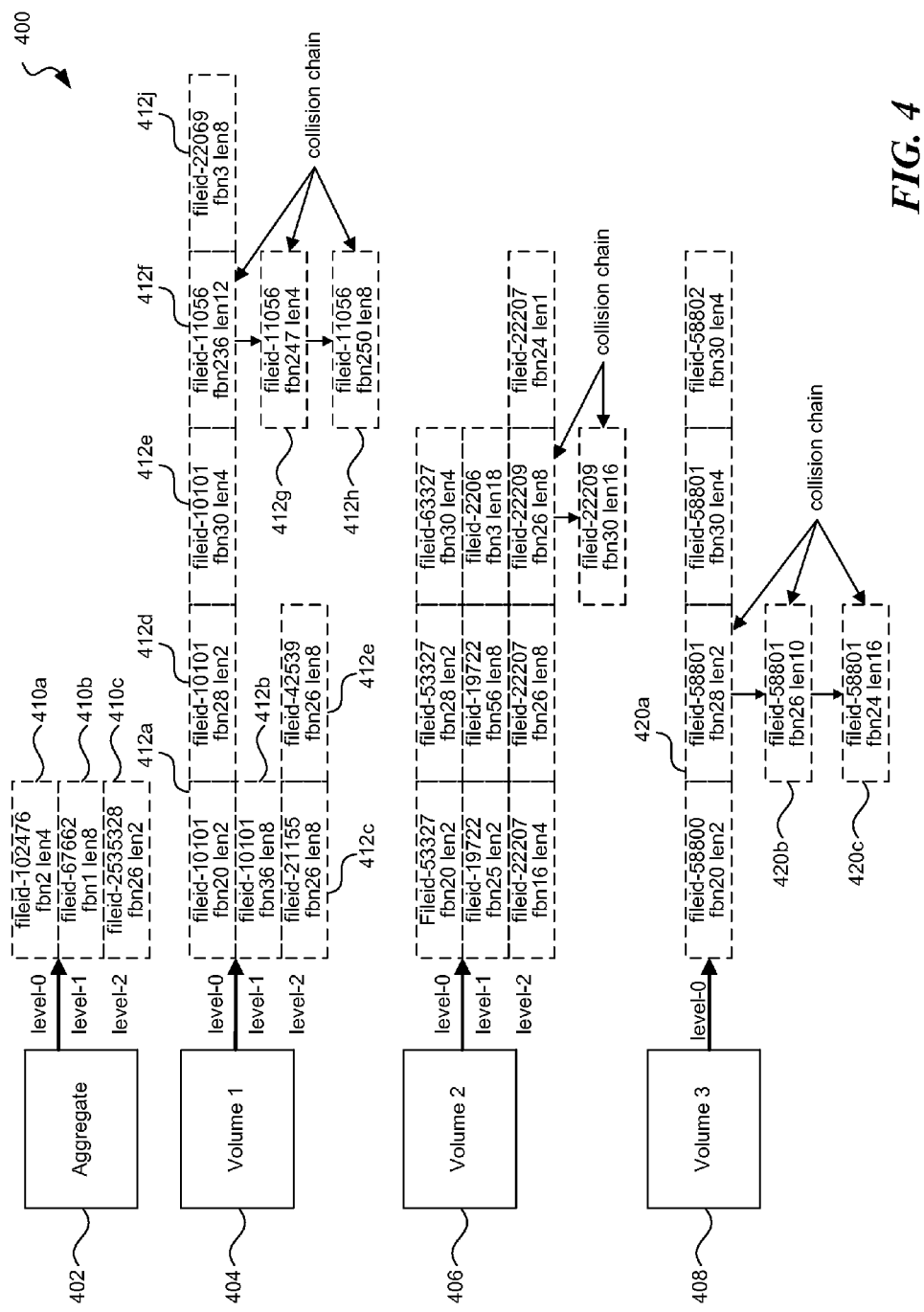
FIG. 4 is a table diagram illustrating a dependency hash data structure, consistent with various embodiments.

FIG. 4 is a table diagram illustrating a dependency hash data structure 400, consistent with various embodiments. The dependency hash 400 can include multiple sections, each relating to an "aggregate" or a "volume." An aggregate can represent multiple logical volumes. A volume can span multiple physical data storage devices. The technology is also capable of functioning with "virtual" volumes that can be stored on a single data storage device or multiple data storage devices, e.g., across other volumes. The dependency hash can be created in "real time," e.g., as the NVRAM log is populated with storage operations. Alternatively, the dependency hash 400 can be created when a storage server recovers from an unexpected shutdown. The dependency hash 400 is a data structure that the technology can use to determine which storage operations can be parallelized. In the illustrated example, a section 402 is associated with an aggregate, and sections 404, 406, and 408 are associated with volumes. Each section can be implemented as a separate dependency hash. Storage operations associated with different aggregates or volumes can be parallelized because, by definition, there is no dependency between their corresponding storage operations. This is because files (e.g., file block numbers) cannot span volumes. In the dependency hash, each section has one or more levels. Storage operations within a level can be parallelized, but storage operations in a subsequent level cannot be committed to a storage device until all storage operations in preceding levels have been committed to storage devices.

For example, section 402 corresponding to an aggregate has three levels (level 0, level 1, and level 2). Level 0 indicates at a node 410a that a file with identifier ("fileid") 102476 has a storage operation beginning at file block number ("fbn") 2 with length ("len") 4; level 1 indicates at a node 410b that fileid 67662 has a storage operation beginning at fbn1 with length 8; and level 2 indicates at a node 410c that fileid 2535328 has a storage operation beginning at fbn26 with length 2. In the art, a file is generally associated with one or more blocks and each block can span 4096 (or some other number) bytes. Thus, the storage operation indicated by node 410a begins at block fbn2 and occupies 4 blocks (e.g., ends at block fbn6).

Section 404 corresponding to volume 1 also has three levels. Level 0 has nodes 412a, 412d, 412e, 412f, and 412j at level 0. No operation at level 0 collides (meaning that an operation writes data to the same block as a different operation). Level 1 has node 412b, which indicates that fileid 10101 has a storage operation beginning at block fbn36 with length 8. Thus, the operation spans blocks fbn26 to fbn34. This span of blocks overlaps two operations indicated by nodes 412d and 412e of level 0. That is why the operation indicated by node 412b is on a different level: it must wait for the operations indicated by nodes 412d and 412e to complete. Nodes 412g and 412h indicate a "collision chain." For example, node 412h indicates that fileid 11056 has a storage operation beginning at block fbn250 with length 8, which would collide with the operation indicated by block 412g. The technology can commit operations on a same level in parallel, but operations indicated by collision chains serially. Operations indicated at level 1 wait until all operations indicated at level 0 complete.

Although FIG. 4 illustrates a data structure whose contents and organization are designed to make them more comprehensible by a human reader, those skilled in the art will appreciate that actual data structures used by the facility to store this information may differ from what is illustrated in that it, for example, may be organized in a different manner, may contain more or less information than shown, may be compressed and/or encrypted, etc.

Figure 5:
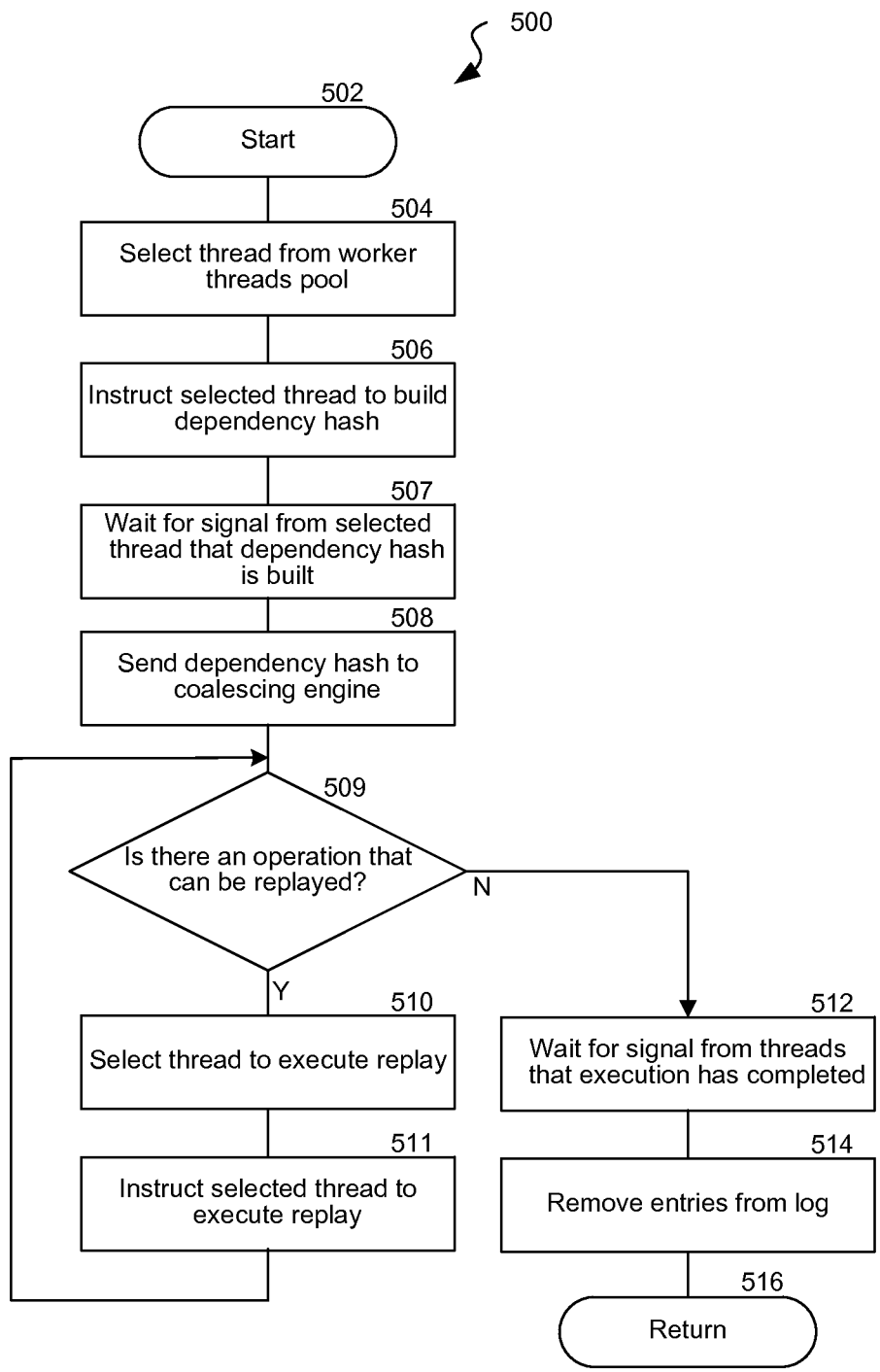
FIG. 5 is a flow diagram illustrating a routine for creating a dependency hash and processing entries in the dependency hash, consistent with various embodiments.

FIG. 5 is a flow diagram illustrating a routine 500 for creating a dependency hash and "executing" the dependency hash (e.g., processing entries in the dependency hash), consistent with various embodiments. The routine 500 may be invoked by a replay administrator, and begins at block 502. At block 504, the routine 500 selects a thread from a pool of threads (e.g., a worker thread from worker threads pool 222). At block 506, the routine 500 instructs the selected thread to build a dependency hash. The routine 500 may indicate a portion of a log file from which to build the dependency hash. At block 507, the routine 500 waits for a signal from the selected thread that the dependency hash has been built. At block 508, the routine 500 sends the built dependency hash to a coalescing engine for processing. At decision block 509, the routine 500 determines whether there is an operation that can be replayed. If so, the routine 500 continues at block 510. Otherwise, the routine 500 continues at block 512. At block 510, the routine 500 selects a thread to execute a replay operation. As an example, the routine 500 may select a worker thread from worker threads pool 222. At block 511, the routine instructs the selected thread to execute the replay operation. The routine then returns to decision block 509 to possibly execute additional storage operations in parallel. At block 512, the routine 500 waits for a signal that all threads have completed their replay operations. At block 514, if the entire log has been replayed, the routine 500 triggers a consistency point to commit the data modified (or otherwise "dirtied") during replay to a data storage device. The routine 500 then returns at block 516. In various embodiments, the routine 500 may be invoked upon reboot from an unexpected shutdown, unplanned storage system failover, etc.

Figure 6:
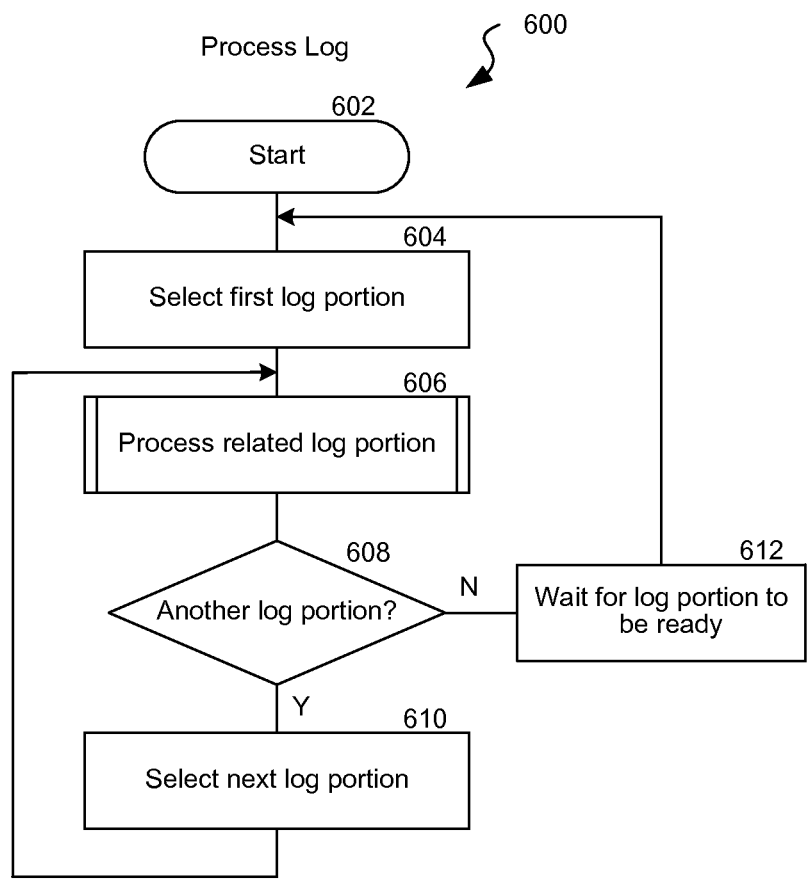
FIG. 6 is a flow diagram illustrating a routine for processing a log file, consistent with various embodiments.

FIG. 6 is a flow diagram illustrating a routine 600 for processing portions of a log file, consistent with various embodiments. The routine 600 begins at block 602. At block 604, the routine 600 selects a portion of a log, e.g., from portions 302a, 302b, etc. At block 606, the routine 600 invokes a routine to construct and execute the dependency hash for the selected portion of the log. The routine 700 for processing the selected portion of the log is described in further detail below in relation to FIG. 7. At decision block 608, the routine 600 determines whether there is another portion of the log to be processed. If there is another portion of the log to be processed, the routine 600 continues at block 610. Otherwise, at block 612 the routine 600 waits for another portion of a log to be ready and then continues at block 604 once the other portion is ready. At block 610, the routine 600 selects the next portion of the log that is ready, and then continues at block 606.

Figure 7:
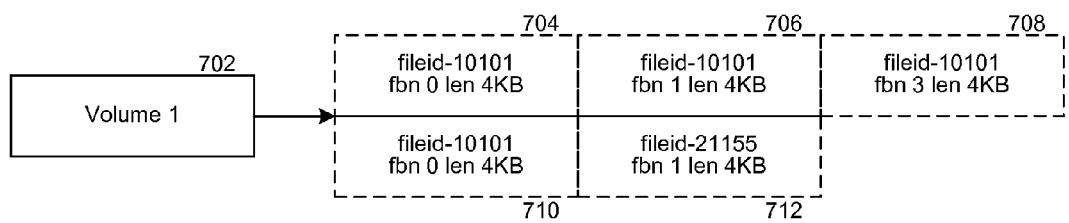
FIGS. 7 and 8 are block diagrams illustrating coalescing of blocks in various embodiments.

FIG. 7 is a block diagram illustrating coalescing of operations in various embodiments. The illustrated portion of the dependency hash indicates its state before a coalescing engine evaluates the dependency hash. During replay to a volume 702, the operations comprising nodes 704 and 706 in a first level can be coalesced because they have adjacent file block numbers (0 and 1) and are operations on the same file (identified by fileid-10101). However, node 708 cannot be coalesced with nodes 704 and 706. The operations of nodes 710 and 712 of a second level cannot be coalesced because they correspond to different files (identified by fileid-10101 and fileid-21155).

Figure 8:
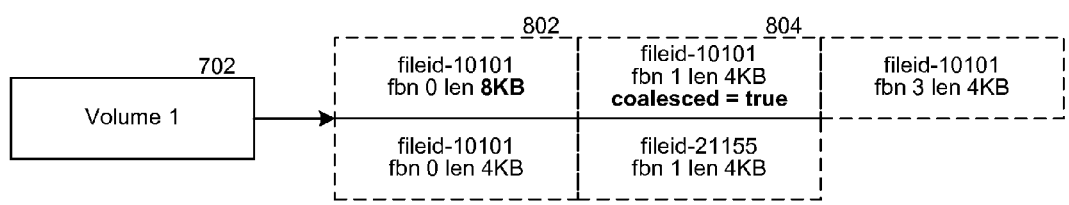

FIG. 8 is a block diagram illustrating coalescing of operations in various embodiments. The illustrated portion of the dependency hash indicates its state after a coalescing engine evaluates the dependency hash. All nodes are unchanged except nodes 802 and 804, which correspond to nodes 704 and 706, respectively, of FIG. 7. Node 802 indicates that the length of the operation occupies 8 KB, which is the total lengths occupied by nodes 704 and 706 (e.g., 4 KB each). Node 804 now has a flag, "coalesced=true," to indicate that the node has been coalesced into some other node and so can be ignored during replay.

Figure 9:
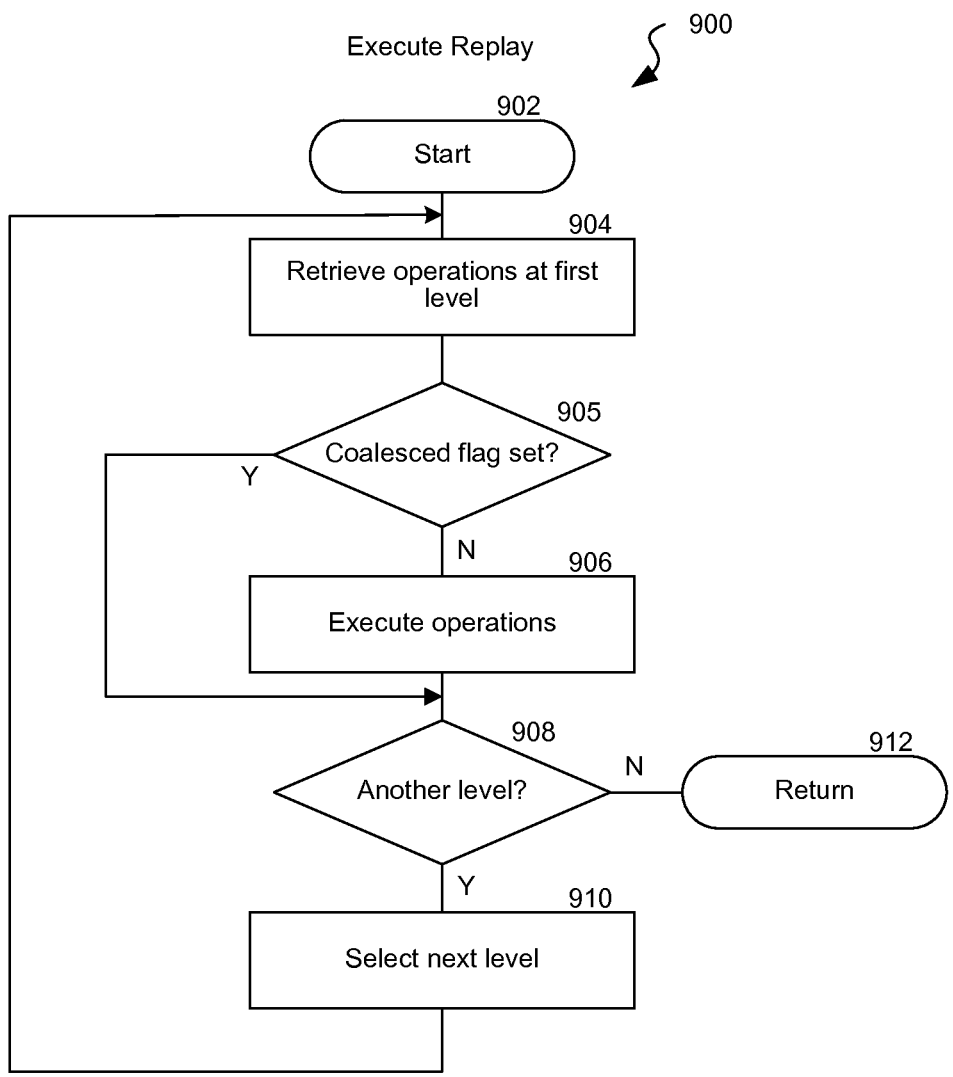
FIG. 9 is a flow diagram illustrating a routine for executing replay of logged storage operations, consistent with various embodiments.

FIG. 9 is a flow diagram illustrating a routine 900 for executing replay of logged storage operations, e.g., transferred from NVRAM and stored in in-memory dependency hashes, consistent with various embodiments. The routine 900 begins at block 902. At block 904, the routine 900 retrieves operations at a first level in a dependency hash. At decision block 905, the routine 900 determines if a coalesced flag is set. If so, the routine 900 continues at block decision block 908. Otherwise, the routine 900 continues at block 906. At block 906, the routine 900 executes operations indicated at the level. At decision block 908, the routine 900 determines whether there is another level to be replayed. If there is another level to be replayed, the routine 900 continues at block 910. Otherwise, the routine 900 returns at block 912. At block 910, the routine 900 selects a next level. The routine 900 then continues at block 904 to retrieve operations at the next level.

Figure 10:
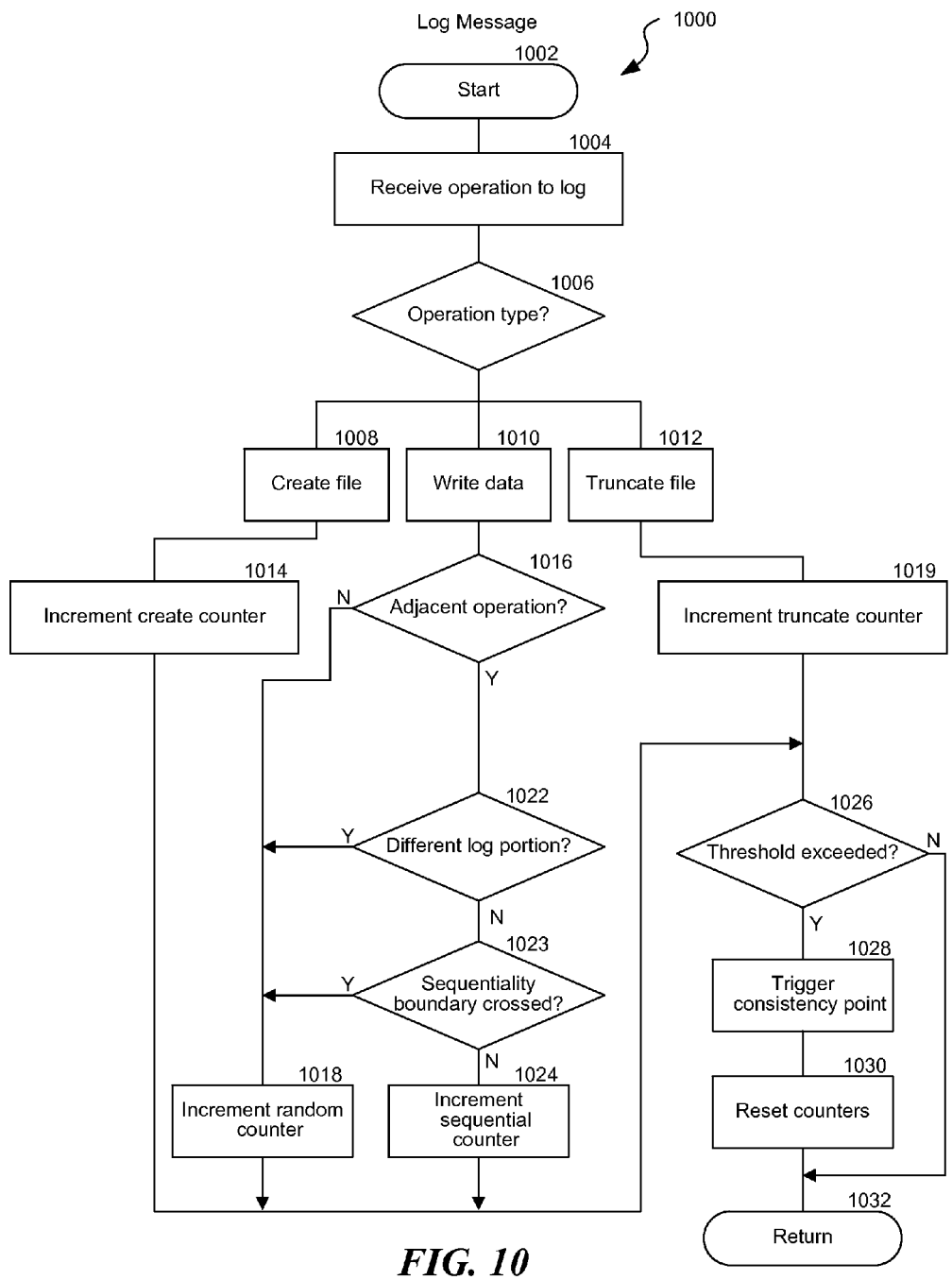
FIG. 10 is a flow diagram illustrating a routine for collecting heuristics on types of operations stored in a log, consistent with various embodiments.

FIG. 10 is a flow diagram illustrating a routine 1000 for collecting heuristics on types of operations stored in a log, consistent with various embodiments. The routine 1000 begins at block 1002. At block 1004, the routine 1000 receives an operation that is to be logged, e.g., in NVRAM. At decision block 1006, the routine 1000 evaluates the type of operation that is to be logged. If the operation type is to create a file 1008, the routine 1000 continues at block 1014. If the operation type is to write data 1010, the routine 1000 continues at decision block 1016. If the operation is to truncate the file 1012 (e.g., delete data), the routine 1000 continues at block 1018. In various embodiments, the routine may also evaluate types of messages other than those described herein. At block 1014, the routine increments a create counter. The routine then continues at decision block 1026. At block 1019, the routine increments a truncate counter and then continues at decision block 1026. At decision block 1016, the routine determines whether there is adjacent operation. In various embodiments, there may be an adjacent operation if a first operation and a second operation both write data in adjacent areas of a data storage device or a volume. As an example, if the first operation writes data at file block number 1 and the second operation writes data at file block number 2, the first operation and the second operation are adjacent. If the operations are adjacent, the routine 1000 continues at block 1020. Otherwise, the routine continues at block 1018. In various embodiments, the technology may determine whether operations are adjacent by locating adjacencies in various data structures, e.g., a hash table or other data structure. In some embodiments, a data storage server may have two logs: a first log is filled with operations and while the logged operations are committed to disk, the first log is locked and a second log is filled. By alternating logs, the data storage server may be capable of increasing throughput. The sequentiality boundary can be crossed, e.g., when there is more sequential data to be written than a message of a data communication protocol is capable of carrying. As an example, a write anywhere file system may be capable of carrying a maximum number of bytes in a message payload. If the two operations are in different portions of the log or in different logs (decision block 1022) or if a sequentiality boundary is crossed (decision block 1023), the routine continues at block 1018. Otherwise, the routine continues at block 1024. At block 1018, the routine 1000 increments a random counter. At block 1024, the routine 1000 increments a sequential counter. In either case, the routine continues at decision block 1026.

At decision block 1026, the routine determines whether the operations exceed a specified threshold time, e.g., a specified length of time that represents the expected execution time of this set of operations at replay time. If the operations exceed the specified threshold, the routine 1000 continues at block 1028. Otherwise, the routine 1000 returns at block 1032. At block 1028, the routine triggers a consistency point. At block 1030, because logged operations have been committed to a data storage device by the consistency point, the routine resets the counters at block 1030 and then returns at block 1032.

The various counts can be used to determine how long it will take to commit the logged operations to data storage devices or volumes. For example, random writes may take longer than sequential writes. Creating a file may take more time than truncating a file.

Figure 11:
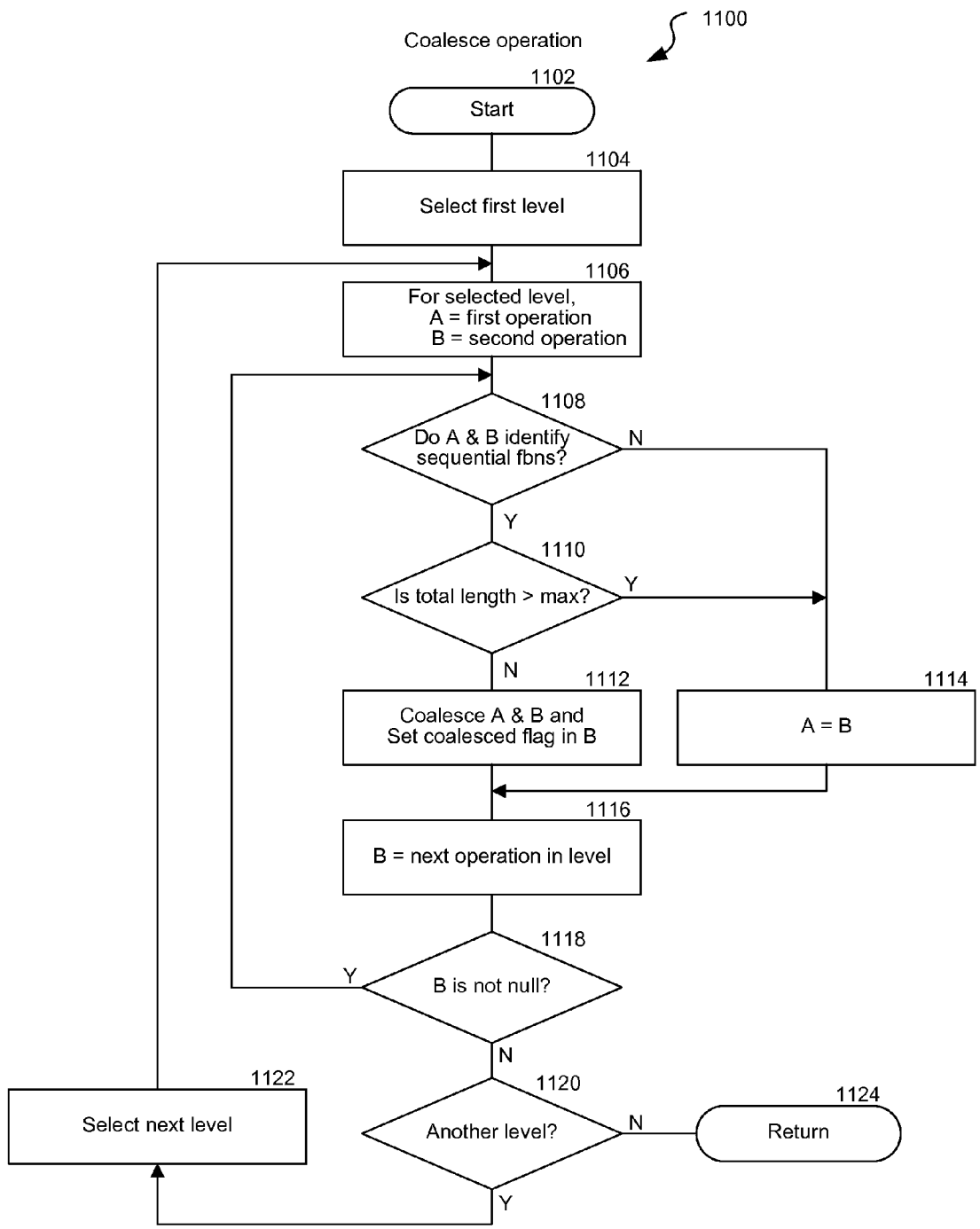
FIG. 11 is a flow diagram illustrating a routine for coalescing operations during replay after an unexpected failure, consistent with various embodiments.

FIG. 11 is a flow diagram illustrating a routine 1100 for coalescing an operation during replay after an unexpected failure, consistent with various embodiments. The routine 1100 may be performed by a coalescing engine. The routine 1100 begins at block 1102. At block 1104, the routine 1100 selects the first level of a dependency hash. At block 1106, for the selected level, the routine 1100 sets a variable A to a first operation and a variable B to a second operation. At decision block 1108, the routine 1100 determines whether A and B identify sequential file block numbers. If A and B identify sequential file block numbers, the routine continues at decision block 1110. Otherwise, the routine continues at block 1114. At decision block 1110, the routine 1100 determines whether the total length of the operation, if both operations are combined (e.g., coalesced), exceed a specified maximum number of blocks. If the total exceeds the maximum size, then the routine 1100 continues at block 1114. Otherwise, the routine 1100 continues at block 1112. At block 1112, the routine 1100 modifies (e.g., coalesces) the operations identified by A and B, and sets a "coalesced" flag for operation B to indicate that operation B should not be separately sent to a storage device. At block 1114, the routine 1100 sets the variable A to the operation previously identified by variable B. At block 1116, the routine 1100 sets the variable B to the next operation in the level. At decision block 1118, if there are no more operations (e.g., B is null), then the routine 1100 continues at decision block 1120. If there are additional operations (e.g., B is not null), then the routine 1100 continues at decision block 1108. At decision block 1120, the routine determines if there is an additional level. If there is another level, the routine 1100 continues at block 1122. Otherwise, the 1100 routine returns at block 1124. At block 1122, the routine 1100 selects the next level, and continues at block 1106.

In various embodiments, the technology implements a method for improving performance during playback of logged data storage operations, comprising: monitoring a log to which data storage operations are written before data is committed to a data storage device or a volume; determining counts of various types of data storage operations; and when the counts exceed a specified threshold, causing the data storage operations to be committed to the data storage device or the volume. The method can include specifying a threshold such that committing the logged data storage operations will not exceed a specified period of time. The method can include determining whether, for a subsequently received data storage operation, there is logged an adjacent data storage operation. The method can include modifying the adjacent data storage operation to include data in the subsequently received data storage operation. The method can avoid modifying the adjacent data storage operation if the subsequently received data storage operation is to be stored in a different portion of the log than a portion in which the adjacent data storage operation is logged. The method can avoid modifying the adjacent data storage operation if there is more sequential data to be written than a message of a data communication protocol is capable of carrying. The data communication protocol is a part of a write anywhere file system specification.

In various embodiments, the technology includes a data storage server, comprising: a processor; a nonvolatile random access memory storing a log; a first volume of the data storage server and a second volume of the data storage server; a component configured to receive a first data storage operation and a second data storage operation, and to store the received data storage operations in the log before committing the data storage operations to one of the volumes; and a component configured to determine whether the second data storage operation, when replayed with the first data storage operation during a replay operation, would cause the replay operation to exceed a specified time duration. If the replay operation would exceed the specified time duration, the second data storage operation can be stored in a different log than the first data storage operation. The data storage server can comprise at least two storage areas in the nonvolatile random access memory, wherein a first storage area is locked for writing but a second storage area is unlocked for writing when data storage operations stored in the first storage area are committed to a volume. The data storage server can further comprise multiple counters to count various types of data storage operations. The data storage server can further comprise a component configured to combine operations affecting adjacent storage areas. The data storage server can further comprise a component configured to separate data storage operations that would otherwise cause a data storage message to be created that is larger than a maximum size for data storage messages. The data storage server can further comprise a component configured to separate data storage operations that are stored in different logs.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

What is claimed is:

1. A non-transitory machine readable medium having stored thereon instructions for performing a method comprising machine executable code which when executed by at least one machine, causes the machine to:

monitor a log to which data storage operations are written before data is committed to a volume;
determine counts of various types of data storage operations; and
replay the data storage operations to be committed to the volume when the counts exceed a specified threshold, wherein the replay further comprises:
determine when for a subsequently received one of the data storage operations there is logged an adjacent prior one of the data storage operations; and
modify the adjacent prior one of the data storage operations to include data in the subsequently received one of the data storage operations when the determining indicates the subsequently received one of the data storage operations is logged adjacent the prior one of the data storage operations.

2. The medium of claim 1, wherein the machine executable code when executed by the machine further causes the machine to specify a threshold such that committing the logged data storage operations will not exceed a specified period of time.

3. The medium of claim 1, wherein for the modify the adjacent prior one of the data storage operations the machine executable code when executed by the machine further causes the machine to not modify during the replay the adjacent prior one of the data storage operations with the data in the subsequently received one of the data storage operations when there is more coalesced data from the modifying to be written than a message of a data communication protocol is capable of carrying.

4. The medium of claim 3, wherein the data communication protocol is a part of a write anywhere file system specification.

5. A non-transitory machine readable medium having stored thereon instructions for performing a method comprising machine executable code which when executed by at least one machine, causes the machine to
receive at least a first data storage operation and a second data storage operation and storing the received data storage operations in a log before committing the data storage operations to a volume; and
determine when the second data storage operation, when replayed with the first data storage operation during a replay operation, would cause the replay operation to exceed a specified time duration; and
combine during the replay operation the first and second data storage operations, when the determining indicates that the second data storage operation, when replayed with the first data storage operation, would not cause the replay operation to exceed the specified time duration, wherein the first and second data storage operations affect adjacent storage areas.

6. The medium of claim 5, wherein the machine executable code when executed by the machine further causes the machine to store the second data storage operation in a different log than the first data storage operation when the replay operation would exceed the specified time duration.

7. The medium of claim 5, wherein the machine executable code when executed by the machine further causes the machine to lock a first storage area for writing and unlocking a second storage area when the data storage operations stored in the first storage area are committed to a volume.

8. The medium of claim 5, wherein the machine executable code when executed by the machine further causes the machine to count various types of the data storage operations.

9. The medium of claim 5, wherein the machine executable code when executed by the machine further causes the machine to separate the data storage operations that would otherwise cause a data storage message to be created that is larger than a maximum size for data storage messages.

10. The medium of claim 5, wherein the machine executable code when executed by the machine further causes the machine to separate the data storage operations that are stored in different logs.

11. A non-transitory machine readable medium having stored thereon instructions for performing a method comprising machine executable code which when executed by at least one machine, causes the machine to:
monitor a log to which data storage operations are written before data is committed to a volume;
determine counts of various types of the data storage operations; and
cause the data storage operations to be committed to the volume when the counts exceed a specified threshold, wherein the causing further comprises:
employ a dependency hash to determine when to coalesce at least two of the data storage operations; and
coalesce the at least two of the data storage operations when indicated by the employed dependency hash.

12. The medium of claim 11, wherein the coalescing the at least two of the data storage operations further comprises machine executable code when executed by the machine further causes the machine to coalesce the at least two data storage operations at a same level of the dependency hash when the at least two data storage operations store data to adjacent file block numbers unless the at least two data storage operations are in a collision chain.

13. The medium of claim 11, wherein the machine executable code when executed by the machine further causes the machine to store file block number ranges associated with the data storage operations which are logged.

14. The medium of claim 13, wherein the storing file block number ranges associated with the data storage operations which are logged further comprises machine executable code when executed by the machine further causes the machine to, further comprises storing, by the computing device, the file block number ranges in one or more dependency hashes.

* * * * *